United States Patent [19]

Dragonetti

[11] 3,864,634

[45] Feb. 4, 1975

[54] DOPPLER CORRECTION CIRCUIT

[75] Inventor: Philip G. Dragonetti, Largo, Fla.

[73] Assignee: The United States of America as represented by the Secretary of the Navy, Washington, D.C.

[22] Filed: Oct. 1, 1973

[21] Appl. No.: 411,615

[52] U.S. Cl. .................... 325/419, 325/17, 325/421
[51] Int. Cl. .............................................. H04b 1/16
[58] Field of Search ............. 325/63, 364, 419–421, 325/432–434, 17, 4, 49, 50; 332/16 R, 18, 19; 329/122; 343/114 R, ; 178/69.5 R

[56] References Cited

UNITED STATES PATENTS

| | | | |
|---|---|---|---|
| 3,263,173 | 7/1966 | Collins, Jr. et al. | 325/420 |
| 3,296,534 | 1/1967 | Graves et al. | 325/419 |
| 3,450,842 | 6/1969 | Lipke | 325/4 |
| 3,461,388 | 8/1969 | Daley | 325/419 |
| 3,800,231 | 3/1974 | Pratt | 325/420 |

OTHER PUBLICATIONS

IBM Technical Disclosure Bulletin on "AFC Loop for Doppler Correction" by E. M. Rutz, vol. 6 No. 3 Aug. 1963.

*Primary Examiner*—Robert L. Griffin
*Assistant Examiner*—Jin F. Ng
*Attorney, Agent, or Firm*—R. S. Sciascia; P. Schneider

[57] ABSTRACT

A circuit for precompensating a transmitted signal for the Doppler shift that will occur during its propagation time. The circuit takes a signal containing positive Doppler information and mixes it in a mixer, which is a component of a phase-lock loop, with a signal containing negative Doppler information which is the reverse of the positive information, leaving a signal which has practically no Doppler content. The phase-lock loop includes the mixer, a phase detector, a loop amplifier and a voltage-controlled oscillator (VCO). The signal from the mixer is fed to the phase detector which provides a DC output signal proportional to the phase difference between the mixer output and a frequency reference signal. The DC signal is amplified by the loop amplifier and used to control the output of the VCO which contains the inverted Doppler information.

4 Claims, 2 Drawing Figures

DOPPLER CORRECTION CIRCUIT

BACKGROUND OF THE INVENTION

The present invention relates generally to communications systems operating over a varying path length and more particularly to communication systems having means for correcting Doppler shift in the transmitted signal.

In a communication system having one station on a satellite and the other station on a moving vehicle, such as a ship, the path length will vary with time while communications are in progress. Whenever the path length between a transmitter and receiver varies with time, there is a shift in the frequency of the signal received relative to the frequency transmitted. This is known as the Doppler shift. In an FM system, this frequency shift results in FM deviation which produces undesirable effects such as increased intermodulation distortion. Prior efforts to compensate for the Doppler shift have resulted in complex, expensive and generally unsatisfactory equipment which relies upon variable-time-delay storage devices to provide frequency compensation.

SUMMARY OF THE INVENTION

According to this invention, a Doppler Correction Unit receives a signal from a tracking receiver, the signal containing positive Doppler shift information. The Doppler information is detected in terms of phase shift by a phase detector which is part of a phase-lock loop. The detected signal is used as a DC control voltage to control the frequency of a voltage-controlled oscillator which produces as an output a signal containing negative (or inverted) Doppler shift information. This inverted Doppler signal can be used to modulate a transmitted frequency. The inverted Doppler corrects the positive Doppler shift which occurs during transmission so that the signal received by a satellite, for example, is at the desired frequency.

OBJECTS OF THE INVENTION

An object of the present invention is to precompensate a transmitted signal for Doppler shift which will be introduced into it during the time of propagation.

Another object of the present invention is to use the amount of Doppler shift present in a signal received from a moving source as a base for percompensating a signal to be transmitted to the same source.

A further object of the present invention is to invert the polarity of the frequency deviation of a received signal and use the inverted signal to precompensate a transmitted signal.

Other objects, advantages and novel features of the present invention will become apparent from the following detailed description of the invention when considered in conjunction with the accompanying drawings wherein:

DESCRIPTION OF THE PREFERRED EMBODIMENT

Figure 1:
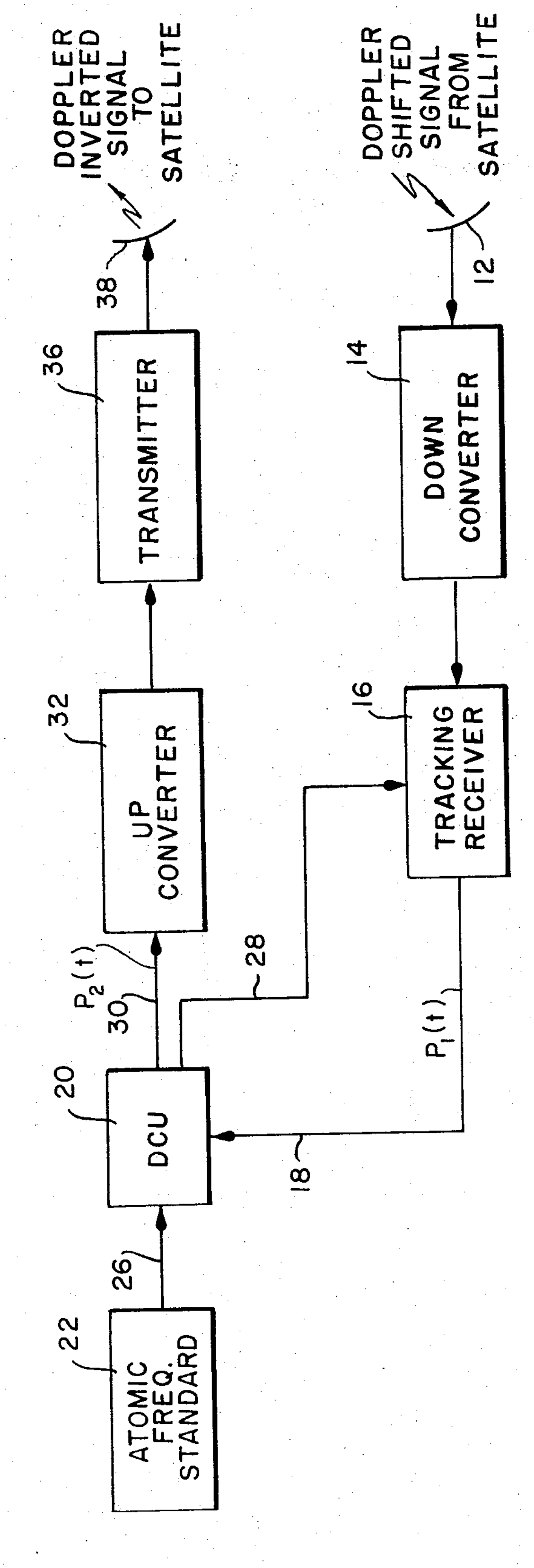
FIG. 1 is a block diagram of the complete system of the invention.

Referring to FIG. 1, a Doppler-shifted signal from a satellite is received by antenna 12 and passed through a down converter 14 to a tracking receiver 16. The down converter 14 is simply a frequency-shifting means for decreasing the frequency of the signal transmitted by the satellite to a frequency suitable for the tuned input circuits of the tracking receiver 16.

The tracking receiver 16 provides Doppler shift information, signal $P_1(t)$. (The ship's motion relative to the satellite results in a Doppler shift in the received signals, i.e., the satellite receives a frequency slightly different from that of the transmitted signal.)

The Doppler-shift signal $P_1(t)$ is fed to a Doppler Correction Unit 20 to which a spectrally pure reference signal from an atomic frequency standard 22 is also coupled. For the particular embodiment shown in the figures, this is a 5MHZ signal.

The Doppler Correction Unit 20 reverses the polarity of the Doppler frequency deviations and applies a Doppler-corrected signal $P_2(t)$ to the transmit channel comprising an up converter 32 which increases the signal frequency, a transmitter 36 and an antenna 38. Thus, a correction applied to the transmitted frequency compensates for the previously determined Doppler shift and the satellite receives the desired frequency.

Figure 2:
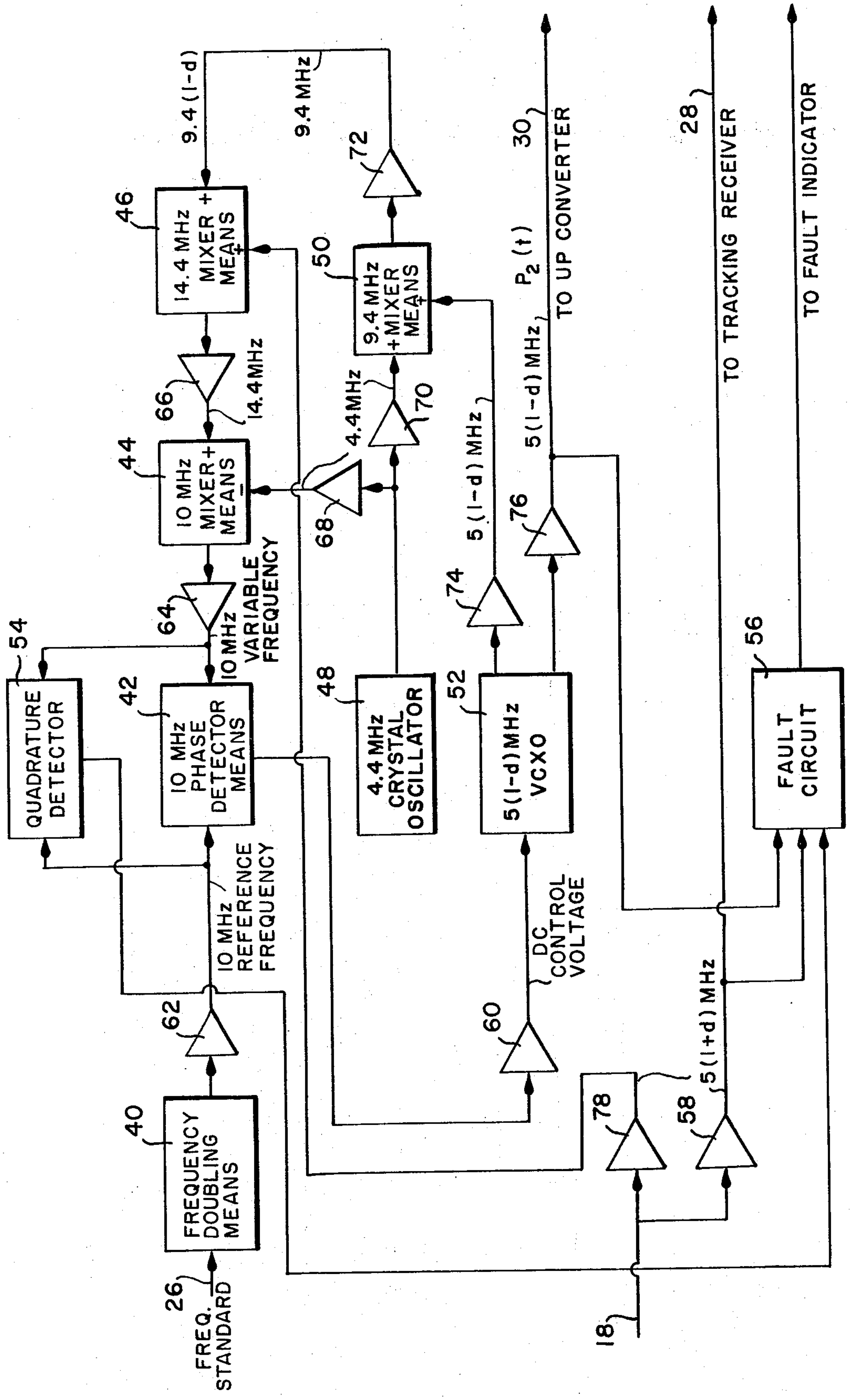
FIG. 2 is a block diagram of the DCU portion of the system.

The Doppler Correction Unit 20 is shown in more detail in FIG. 2. There are two inputs to this unit: (1) a 5MHZ reference signal on line 26 from the atomic frequency standard; and (2) a positive Doppler signal, $P_1(t) = 5(1+d)$MHZ, on line 18 from the tracking receiver 16. The letter "$d$" in this equation symbolizes Doppler deviation.

The reference-frequency signal is coupled thru a frequency-doubling means 40 into a 10MHZ phase detector means 42.

The signal from the tracking receiver $P_1(t) = 5(1+d)$MHZ is fed to a 14.4MHZ mixer means 46 (each mixing means in FIG. 2 is labelled with its output frequency).

The Doppler Correction Unit 20 utilizes a 10MHZ phase-lock loop to derive the $5(1\text{-}D)$MHZ correction signal (which is also called the inverted Doppler signal) from the positive Doppler $5(1+d)$MHZ signal received from the satellite. The loop comprises a voltage-controlled crystal oscillator (VCXO), 52, a 9.4MHZ mixer means 50, a 14.4MHZ mixer means 46, a 10MHZ mixer means 44, a 10MHZ phase detector means 42 and a loop amplifier 60. The output of the VCXO is the desired correction signal, $P_2(t) = 5(1-d)$MHZ, where the $-d$ is the inverted Doppler shift portion of the signal. This signal is fed to a 9.4MHZ mixer 50 along with a 4.4MHZ signal from a crystal oscillator 48. The output of the 9.4MHZ mixer 50 is a $9.4(1-d)$MHZ signal which is applied to a 14.4MHZ mixer means 46 along with the $P_1(t) = 5(1+D)$MHZ positive Doppler output signal from the tracking receiver 16. The output from this mixer is applied to a 10MHZ mixer means 44 along with the output of the 4.4MHZ crystal oscillator 48, providing a mixed output to the 10MHZ phase detector means 42. This signal, which is applied to the phase detector 42, is a 10MHZ, variable-frequency signal having a minute Doppler content. In phase-lock loop therory it would be said that the $(1-d)$ and $(1+D)$ signals cancel each other and there is no Doppler content in the out. However, this is not absoultely true; the $(1+d)$ and $(1-d)$ signals are not exactly equal and therefore do not completely cancel each other, so that the mixer output contains a minute Doppler content. It is this minute content which provides the phase detector with an output which can be amplified by the high-gain loop amplifier 60 to control the VCXO 52.

The output of the phase detector 42 is a signal whose instantaneous voltage is proportional to the phase difference between its two input signals. When the loop is locked, this signal is a DC voltage having a very small AC component. A DC control voltage is obtained from the loop amplifier 60 which determines the basic parameters of the phase-lock loop. (As the amplification is increased, the degree of cancellation of the positive and negative Doppler signals fed to the 14.4MHZ mixer 46 can become almost 100%). The DC control voltage is applied to the VCXO 52 so that the frequency deviation of its output voltage is practically equal and opposite to that of the 5(1+*d*)MHZ signal from the tracking receiver.

It should be noted that there are filter amplifiers 58, 62, 66, 68 70, 72, 74, 76 and 78 in the circuit of the Doppler Correction Unit, as required.

The outputs of the Doppler Correction Unit 20 are the correction signal to the up converter 32 and an amplified and filtered positive Doppler 5(1+*d*)MHZ signal to the tracking receiver.

Fault indication is produced when (1) the 5(1+*d*) output is lost, (2) the 5(1−*d*) output is lost, or (3) the unit is out of phase lock. To detect phase lock, a quadrature detector 54 monitors the two inputs to the phase detector 42 and provides a DC voltage to the fault circuit 56 when phase lock exists. The fault circuit 56 monitors this DC input and also the 5(1+*d*) MHZ and 5(1−*d*)MHZ signals.

The frequencies which have been mentioned herein are for a particular embodiment and may be changed for other embodiments.

Obviously, many modifications and variations of the present invention are possible in light of the above teachings. It is therefore to be understood that, within the scope of the appended claims, the invention may be practices otherwise than as specifically described.

What is claimed is:

1. A circuit for correcting Doppler shift in a transmitted signal for use with a tracking receiver providing an output signal containing positive Doppler information comprising, in combination: 'phase-lock-loop means comprising phase-detector means, loop amplifier means, voltage-controlled oscillator means (VCO) and mixer means, all being connected in said loop in the order named and receiving as an input the output of the preceding means in said loop;

frequency standard means the output of which is connected as an input to said phase-detector means; and oscillator means connected to supply one input signal to said mixer means, said positive Doppler signal being fed to said mixer means as a third input, the output of said mixer means being a signal having minute Doppler content corresponding to the Doppler shift in the output of the tracking receiver, the output of the mixer means being compared in phase by said phase-detector means to the output of said frequency standard means and the phase difference being detected to provide a control signal which is amplified by the loop amplifier and used to control the operation of the VCO, the output of the VCO being a signal containing the positive Doppler information in inverted form.

2. A circuit as in claim 1, wherein said mixer means includes a first, a second and a third mixer circuit, said first mixer output being fed to second mixer, said second mixer output being fed to said third mixer, and said third mixer output being fed to said phase-detector means, the output from said VCO being fed to said first mixer, the signal containing positive Doppler information being fed to said second mixer, and the oscillator circuit output being fed to said first and third mixers.

3. A circuit as in claim 2, wherein the frequency of the signal containing positive Doppler information is 5(1+*d*)MHZ, where d is the Doppler deviation, the output frequency of the frequency standard means is 10MHZ, the output frequency of the VCO is 5(1−*d*)MHZ, the frequency of the oscillator circuit is 4.4MHZ, the output frequency of the second mixer is 14.4MHZ, the output frequency of the third mixer is 10MHZ with a minute Doppler variation, and the phase-detector means operates at 10MHZ.

4. A circuit for correcting Doppler shift in a transmitted signal for use with a tracking receiver providing an output signal containing positive Doppler information comprising, in combination:

phase-lock-loop comprising phase-detector means, loop amplifier means, voltage-controlled oscillator means (VCO), first mixer means, second mixer means and third mixer means, all being contected on said loop in the named order and receiving as an input the output of the preceding means in the loop;

frequency standard means feeding its output to said phase-detector means as one of its inputs; and oscillator means connected to supply its output as one input signal to said first and to said third mixers, said positive Doppler signal being fed to said second mixer means, the output of said third mixer means being a signal having Doppler content corresponding to the Doppler shift in the output of the tracking receiver, the output of the third mixer means being compared in phase by said phase-detector means to the output of said frequency standard means and the phase difference being detected to provide a control signal which is amplified by the loop amplifier and used to control the operation of the VCO, the output of the VCO containing the positive Doppler information in inverted form.

* * * * *